United States Patent
Berklich, Jr. et al.

(10) Patent No.: US 7,226,111 B2
(45) Date of Patent: Jun. 5, 2007

(54) INTEGRATED SPRING ACTUATOR STRUT ASSEMBLY

(75) Inventors: Louis William Berklich, Jr., Lake Orion, MI (US); Jose Maria Garcia, Troy, MI (US); Gregory Alan Miller, Oxford, MI (US); Bradley William Semp, Macomb, MI (US); Charles Leroy Hazel, Wolverine, MI (US)

(73) Assignee: Hi-Lex Controls Inc., Troy, MI (US)

( * ) Notice: Subject to any disclaimer, the term of this patent is extended or adjusted under 35 U.S.C. 154(b) by 14 days.

(21) Appl. No.: 10/967,000

(22) Filed: Oct. 15, 2004

(65) Prior Publication Data

US 2006/0043763 A1    Mar. 2, 2006

Related U.S. Application Data

(60) Provisional application No. 60/604,147, filed on Aug. 24, 2004.

(51) Int. Cl.
*B60J 5/10* (2006.01)

(52) U.S. Cl. .............................. 296/146.4; 296/146.8; 49/343

(58) Field of Classification Search ............. 296/146.4, 296/146.8; 49/343, 341
See application file for complete search history.

(56) References Cited

U.S. PATENT DOCUMENTS

| | | | |
|---|---|---|---|
| 5,944,376 A * | 8/1999 | Buchanan, Jr. ........... | 296/146.4 |
| 6,516,567 B1 * | 2/2003 | Stone et al. .................. | 49/343 |
| 6,557,924 B2 * | 5/2003 | Lauderbach et al. ...... | 296/146.4 |
| 6,707,173 B2 * | 3/2004 | Bauman et al. ............... | 310/12 |

* cited by examiner

*Primary Examiner*—Dennis H. Pedder
(74) *Attorney, Agent, or Firm*—Brinks Hofer Gilson & Lione

(57) ABSTRACT

An integrated gas strut actuator strut assembly particularly adapted for providing power actuation of a motor vehicle lift gate or other opening closure. The system integrates the function of a counterbalancing gas spring and that of a electrically powered actuator. The system incorporates a strut assembly including a gas charged cylinder, and internal plunger and a threaded rod. Rotation of the threaded rod through a cable drive system causes the internal plunger to be advanced or retracted within the cylinder. Another feature of the invention are various embodiments of couplers between the gas cylinder plunger and rod and connectors for the assembly to the vehicle.

18 Claims, 6 Drawing Sheets

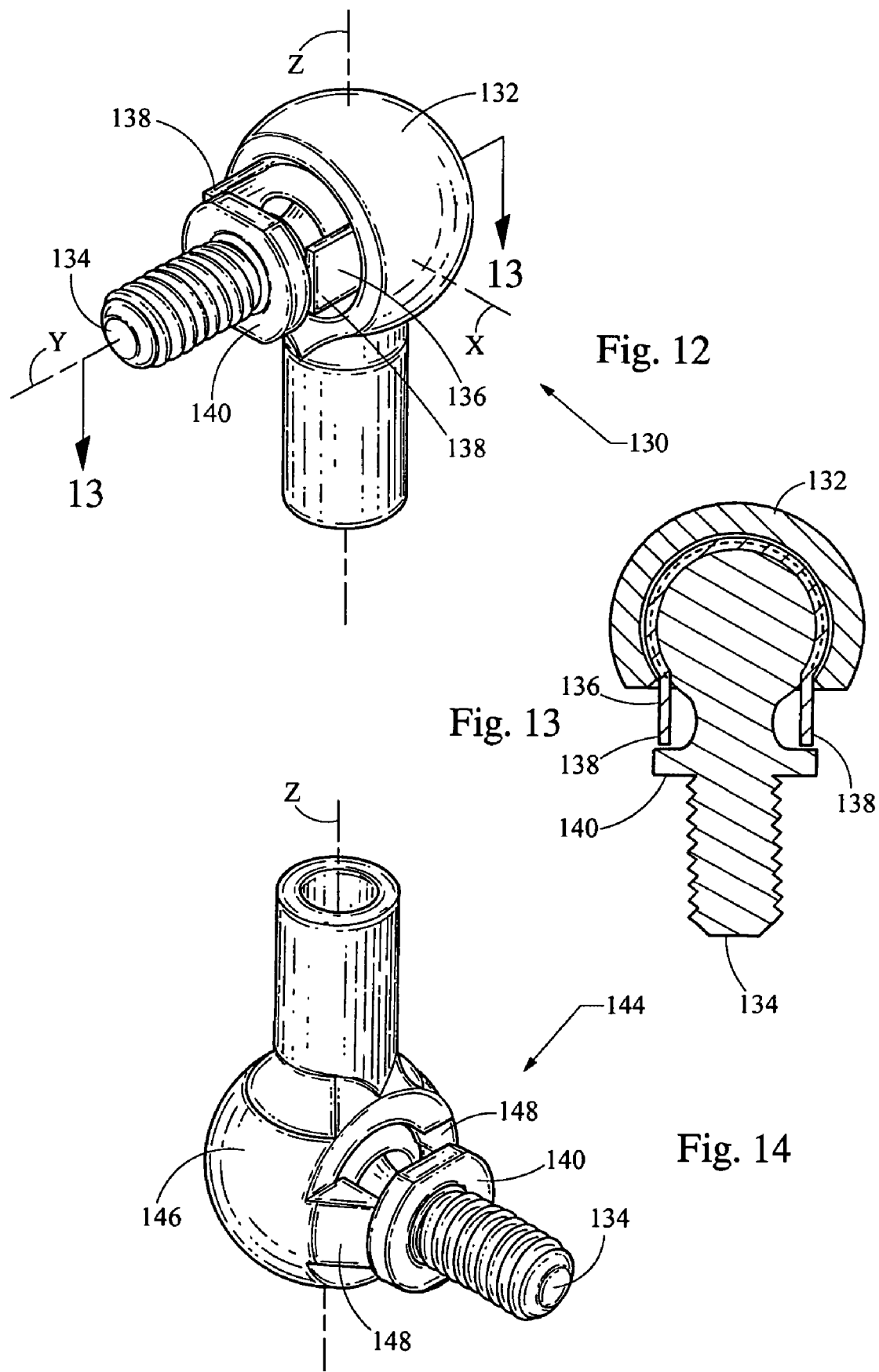

INTEGRATED SPRING ACTUATOR STRUT ASSEMBLY

CROSS REFERENCE TO RELATED APPLICATION

This application claims priority to provisional patent application Ser. No. 60/604,147 filed Aug. 24, 2004.

BACKGROUND OF THE INVENTION

This invention relates to an assembly for controlling the motion of a body closure panel, such as found in motor vehicles. More particularly, this invention relates to an integrated gas spring and actuator assembly, which in one embodiment, is especially adapted for rear hatch doors of motor vehicles.

Motor vehicles have closure panels to allow ingress and egress from the vehicle, to provide access to vehicle compartments for the movement of cargo and passengers, and for servicing the vehicle. Certain types of motor vehicles, for example, sport utility vehicles and mini vans frequently include a large rear hatch or lift gate. These panels can be quite large and include the backline glass. Some of these panels span the entire height and width of the rear area of the vehicle. In order to reduce effort for the opening and closing of these panels, counterbalancing springs are used. The current predominant form of counterbalancing springs are so-called gas springs or gas struts which are gas filled cylinders, typically attached to the left and right-hand sides of the panel opening, with their ends attached to the vehicle body and door. In addition to counterbalancing the weight of the door to ease opening and closing, gas spring devices further incorporate internal damping to control the rate at which the doors open and close. Gas spring struts are also found in other body closure panels, such as the hoods covering the vehicle engine compartment.

A recent innovation to improve the convenience of use of hatch doors, is a provision of remote electric powered actuators. The system allows the vehicle operator to open and close the hatch panel, simply by controlling an electrical switch. One type of electric actuator incorporates an electric motor, gear reducer and cable connected with an actuator strut. The actuator strut includes an internal threaded rod and nut, and rotation of the lead screw causes the nut to move along the length of the lead screw which is coupled to the door for controlling its motion. These power actuators perform well and are valued features in motor vehicles. An example of such a system is provided with reference to U.S. Pat. No. 6,516,567 which is owned by the assignee of this invention and is hereby incorporated by reference.

Motor vehicle components suppliers are constantly striving to improve their products. With respect to the system described by the previously noted U.S. Pat. No. 6,516,567, the motor vehicle lift gate incorporates three strut devices, including gas spring struts on both the left and right-hand side of the vehicle opening, with the actuator strut positioned on one side of the opening. This invention provides a device which combines the functions of a gas spring strut with a power actuator. This approach eliminates one component from the rear hatch opening of the vehicle. In addition to the esthetic improvements, this integration further reduces the number of components required for the vehicle.

SUMMARY OF THE INVENTION

In accordance with one embodiment of this invention, an integrated spring actuator strut assembly is provided which incorporates a gas strut cylinder having an actuator drive nut. Rather than a smooth plunger rod as is typically found in gas struts, a threaded rod is used. The threaded rod end abuts the gas spring plunger. The threaded rod is caused to rotate through activation of a drive motor through a cable, as in the case of prior art lift actuators as previously described.

In some applications, it may be desired to employ an existing design of a gas strut without significantly modifying its internal components. Certain types of presently available gas springs utilized compressed gas on two sides of the moving plunger. This is principally provided to enable automatic temperature compensation for the gas struts, providing them with consistent performance over a range of temperatures. In accordance with another aspect of this invention, an alternate embodiment of an integrated spring strut assembly is described having an external thread on the outside of the gas strut cylinder which meshes with an internally threaded nut which is caused to rotate by a drive system.

Another feature of this invention is a means of conveniently connecting a subassembly with the threaded rod to the cylinder subassembly. This is advantageous since it would permit parts to be separately supplied by a gas strut manufacturer, and a manufacturer of the remaining elements of the power actuator.

In the traditional gas strut system, a ball-and-socket arrangement is typically used to attach the ends of the strut to the vehicle mounting points. Ball-and-socket joints allow a degree of relative movement between the components as the lift gate undergoes its opening and closing motion. In the case of a power actuator, however, it is important to monitor the rotated position of the threaded rod which is translated directly to a position of the lift gate. However, if a significant amount of lost motion is present in the attachments of the strut of the vehicle, precise relationship between the rotated position of the threaded rod and closure panel position is lost. In accordance with another feature of this invention, several embodiments of mounting systems for the integrated spring actuator assembly are provided.

Additional benefits and advantages of the present invention will become apparent to those skilled in the art to which the present invention relates from the subsequent description of the preferred embodiment and the appended claims, taken in conjunction with the accompanying drawings.

BRIEF DESCRIPTION OF THE DRAWINGS

FIG. 12 is an elevational view of a first embodiment of a ball stud attachment in accordance with this invention for connecting the integrated spring actuator strut assembly to a vehicle;

FIG. 13 is a cross-sectional view through the ball stud of FIG. 12 taken along line 13—13 of FIG. 12; and FIG. 14 is an elevational view of a ball stud attachment in accordance with a second embodiment of this invention.

DETAILED DESCRIPTION OF THE INVENTION

Figure 1:
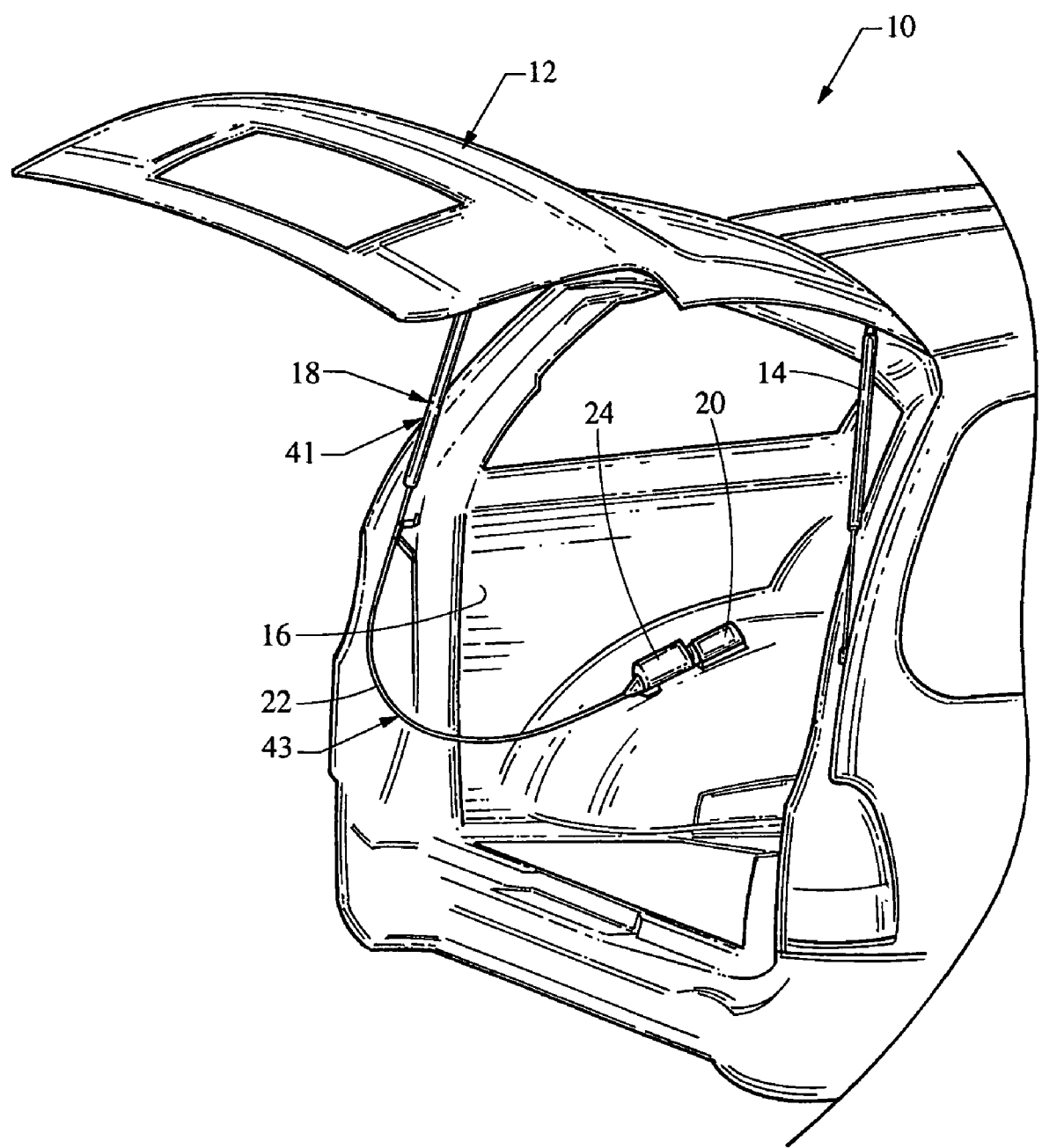
FIG. 1 is a pictorial view of the rear area of a motor vehicle including a lift gate shown in an opened position with the integrated spring actuator strut assembly according to this invention mounted to the vehicle.

FIG. 1 illustrates motor vehicle 10 of a mini van or sport utility type. Motor vehicle 10 includes a rear hatch door or lift gate 12 shown in an open position in the figure. A conventional gas spring strut 14 is provided on the right-hand side of the lift gate opening 16. The left-hand side of the lift gate opening 16 includes integrated spring actuator strut assembly 18 according to this invention. An actuator is used including an electric drive motor 20 which rotates cable 22 through gear reducer 24. Additional references and descriptions of drive motor 20, cable 22, and gear reducer 24 may be obtained by reference to the previously noted U.S. Pat. No. 6,516,567.

Preferably, electric drive motor 20 and gear reducer 24 are hidden behind interior trim panels of the vehicle. Cable 22 passes through an opening in the trim (not shown) to connect with integrated spring strut assembly 18. In addition to permitting hidden placement of system drive components, cable 22 also allows strut assembly 18 to move during the motion of opening and closing of lift gate 12.

Figure 2:
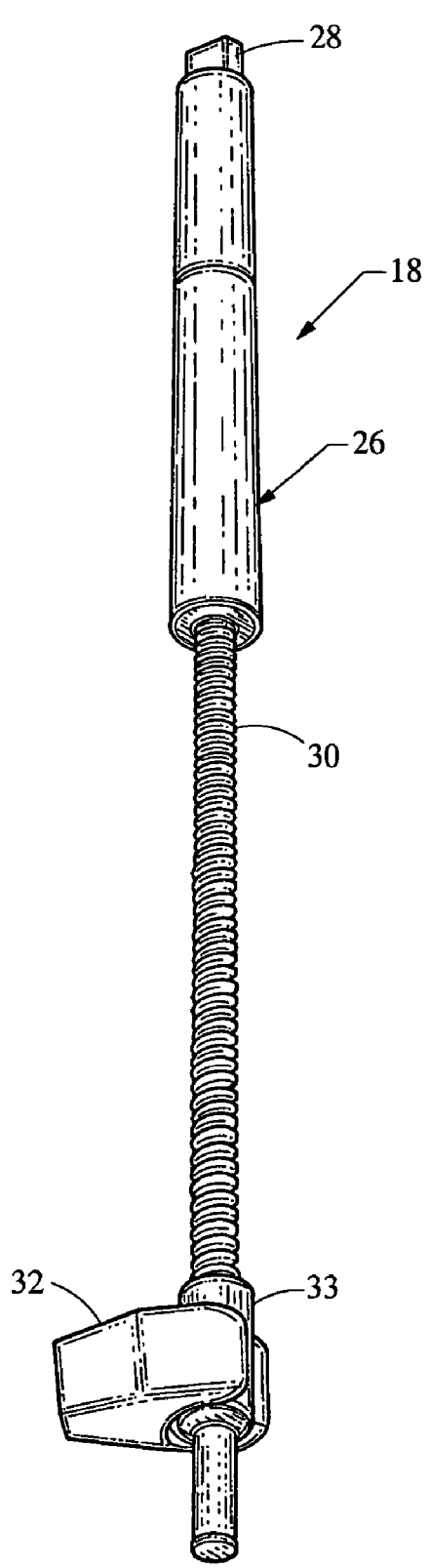
FIG. 2 is an elevational view of the integrated spring actuator strut assembly according to a first embodiment of this invention.

Now with reference to FIG. 2, a more detailed illustration of the components of strut assembly 18 is provided. Strut assembly 18 includes hollow case or cylinder 26 which is preferably formed from tube stock. Upper lift gate mount 28 is formed at the top of cylinder 26 and allows the device to be fixed to lift gate 12 of the vehicle. Various attachment approaches may be utilized, including one of the ball-and-socket arrangements described below. Threaded rod 30 extends from cylinder 26 and is mounted for rotation to lower vehicle mount 32, which also attaches to the vehicle body through a ball-and-socket arrangement. An internal bearing 33 at lower vehicle mount 32 allows threaded rod 30 to freely rotate. Cylinder 26 defines longitudinal axis Z.

Figure 3:
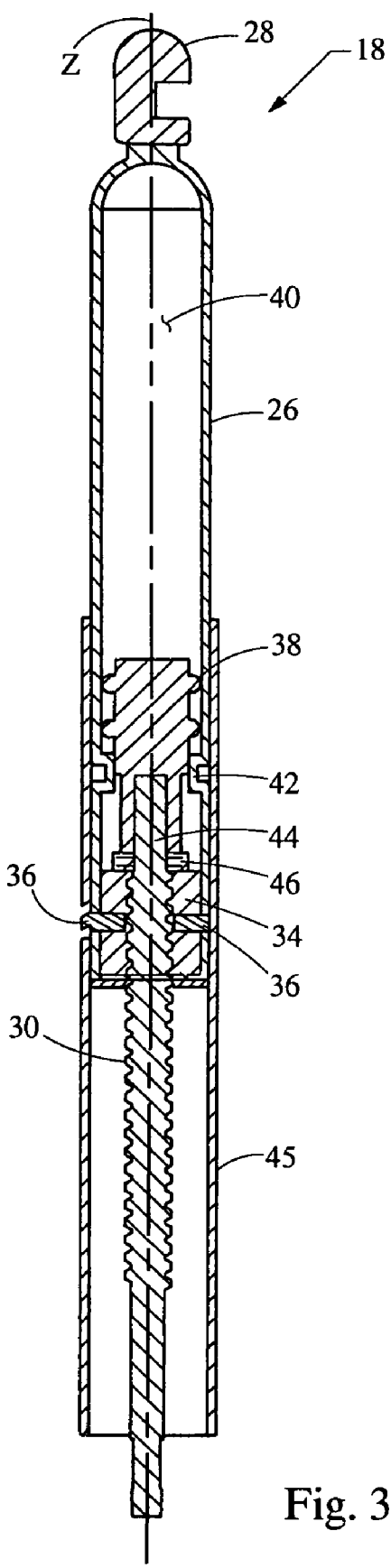
FIG. 3 is a cross-sectional view taken longitudinally through the assembly of FIG. 2.

FIG. 3 provides a cross-sectional view through strut assembly 18, showing internal components. Nut 34 is positioned at the bottom open end of cylinder 26 and forms internal threads which mate with the external threads of rod 30. Nut 34 is fixed to cylinder 26 so that it does not rotate or move longitudinally within the cylinder. Nut 34 can be mounted to cylinder 26 by various means including the use of pins 36 as illustrated in the figure. Various other attachment approaches could be implements, including fusion bonding, adhesives, or through deformation of nut 34 or cylinder 26. Internal plunger 38 is movable within cylinder 26 and is acted upon by gas within closed gas chamber 40. Compression of the gas within chamber 40 provides the desired counterbalancing effect in the manner of a conventional gas spring strut. A mechanical stop in the form of inward shoulder 42 prevents plunger 38 from escaping from within cylinder 26. Cylinder 26, rod 30 and plunger 38 are coaxially located on longitudinal axis Z.

Drive end 44 of rod 30 abuts and engages plunger 38. In operation, rod 30 rotates and moves longitudinally relative to nut 34, driving plunger 38 to move within gas chamber 40. It is desirable to reduce the level of torque loads acting on plunger 38 caused by rotation of rod 30. Therefore, in a preferred embodiment, an anti-friction thrust bearing would be provided between these components. The embodiment illustrated in FIG. 3 incorporates roller thrust bearing 46 for this purpose. An outer cover tube 45 encloses rod 30 for esthetic improvements and to shield the rod from contamination, or having items wrap around it.

When an operator of motor vehicle 10 desires to open or close the lift gate 12, drive motor 20 is actuated to cause rotation of rod 30. Rod 30 rotates and threads into and out of nut 34, forcibly moving plunger 38 within gas chamber 40. This action changes the distance between upper lift gate mount 28 and lower body mount 32, thus causing the lift gate 12 position to be changed. A desirable feature is to permit the motor vehicle operator to manually open and close lift gate 12. In such instances, manual movement of lift gate 12 will cause a change in the separation between vehicle mounts 28 and 32. This motion forcibly causes rod 30 to rotate within nut 34. This "free-wheeling" motion is accommodated through provision of a clutch within gear reducer 24 or drive motor 20. In this way, the system can be "back-driven" as desired to permit such manual operation. This manual override feature is also known as described by the previously noted U.S. Pat. No. 6,516,567.

Another feature of this invention relates to the coupling between rod drive end 44 and plunger 38. Several embodiments of coupler designs for these components are described herein. Convenience, quick, or "snap" attachment between these components is desired to permit the components of strut subassembly 41, which includes cylinder 26, plunger 38, nut 34, and upper mount 28; and actuator subassembly 43 components, including rod 30 and the connected components, to be conveniently combined. Moreover, it is desired to permit these assemblies to be disassembled conveniently for warranty repair or component replacement in a manner which would not require the entire assembly 18 to be replaced as a unit. Convenient attachment between strut subassembly 41 and actuator subassembly 43 also provide the ability for separate manufacturers to supply them.

Figure 4:
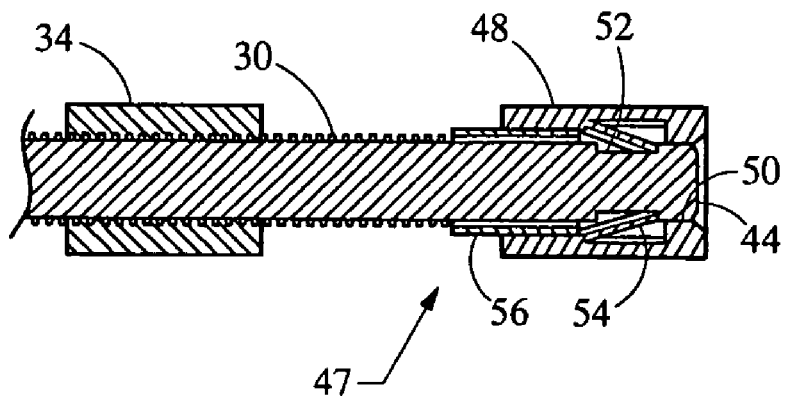
FIG. 4 is first embodiment of a coupler between the threaded rod and strut plunger of an integrated spring actuator strut assembly according to this invention showing the coupler elements assembled.
Figure 5:
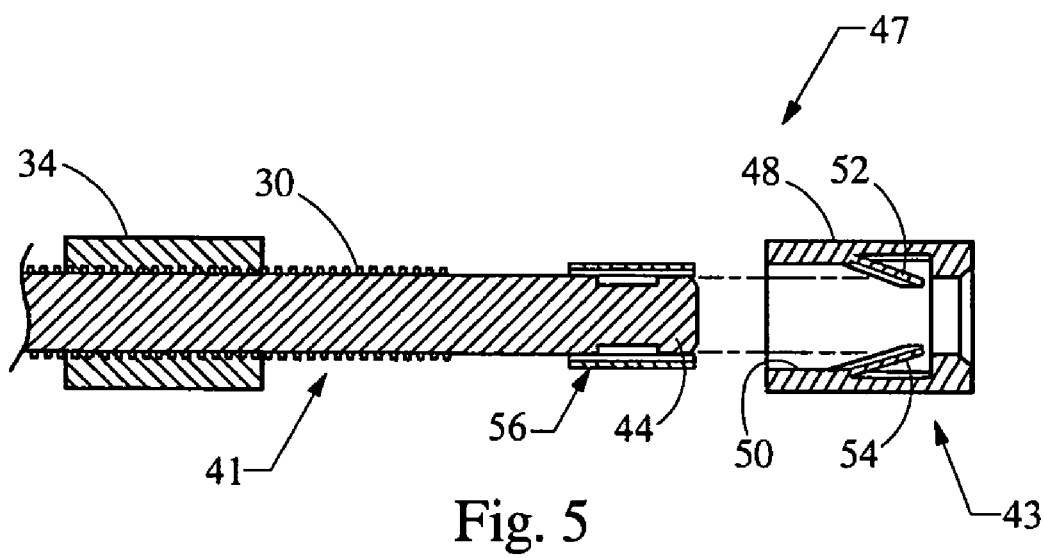
FIG. 5 is a cross-sectional view similar to FIG. 4 but showing the coupler in a disengaging position.

A first embodiment of such a releasable coupler 47 is described with reference to FIG. 4. As illustrated, retainer 48 is coupled with plunger 38 (not shown in FIG. 4) and includes an internal hollow socket 50. In this embodiment, rod drive end 44 includes groove 52. Socket 50 incorporates engagement elements in the form of inwardly deflecting fingers or tabs 54. Insertion of drive end 44 into socket 50 causes fingers 54 to be initially deflected in a radially outward manner, and further insertion causes them to snap into position engaging with groove 52. Once assembled in this manner, the parts are locked together and the rod 30 can exert pushing and pulling forces on plunger 38. As mentioned previously, it is desirable to further allow these components to be disassembled as required. Release ring 56 is provided to enable such disconnection. In the normal position of release ring 56, it is retracted relative to drive end 44. When it is desired to disassemble these components, release ring 56 is pushed toward drive end 44 as shown in FIG. 5, causing engagement with fingers 54 and retracting them from their position in engagement within groove 52. This allows the actuator subassembly 43 and strut subassembly 41 to be disassembled.

Figure 6:
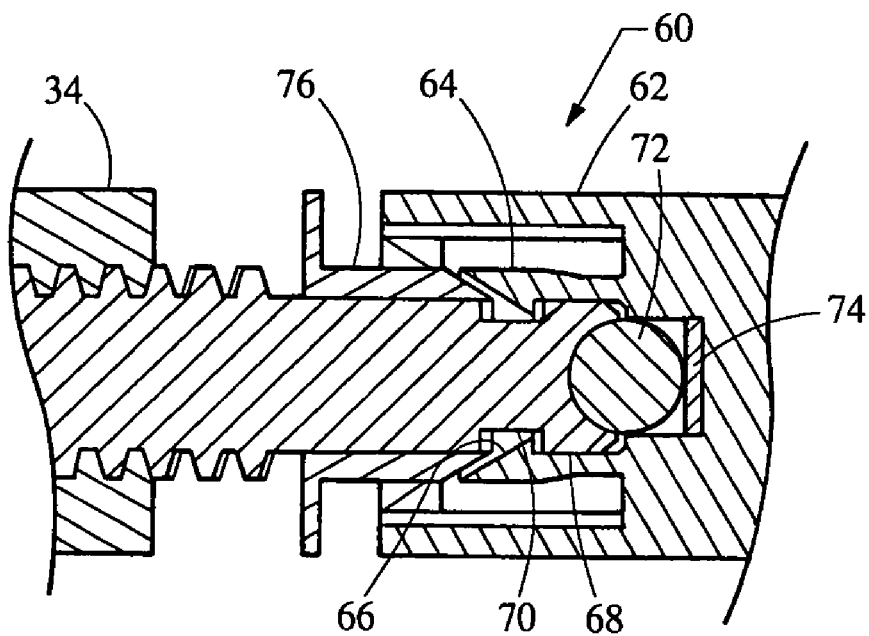
FIG. 6 is a cross-sectional view of a second embodiment of a coupler between the threaded rod and strut plunger showing the elements assembled.
Figure 7:
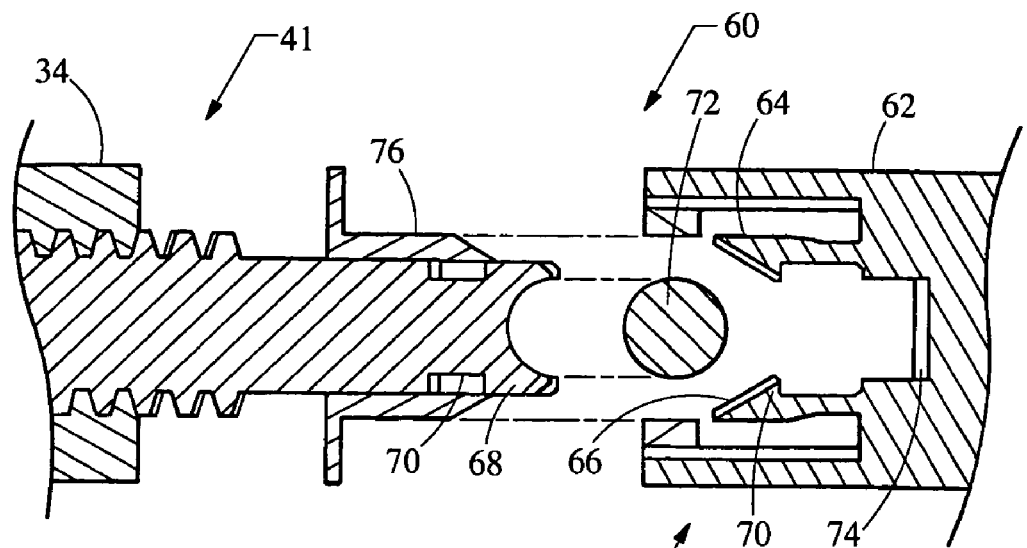
FIG. 7 is a cross-sectional view similar to FIG. 6 showing the coupler in a disengaging position.

With reference to FIG. 6, a second embodiment of a coupler 60 is shown. In this instance, retainer 62 includes a projecting barrel or tube which is split to form a number of engagement elements in the form of fingers 64 with inwardly directed teeth or barbs 66. Insertion of rod drive end 68 causes the barbs 66 to initially be deformed in a radially outward direction until they can snap into engagement with groove 70. Coupler 60 further incorporates release ring or bushing 76. Release bushing 76 includes a forward edge which is conically tapered. As shown in FIG. 7, depressing release bushing 76 into engagement with fingers 64 causes them to be expanded in a radially outward direction, releasing the interengagement between barbs 66 and grooves 70. This embodiment of coupler 60 further incorporates an anti-friction thrust bearing in the form of ball 72 which contacts bearing plate 74. Since the contact between ball 72 and bearing plate 74 is essentially point contact, very little torque is transmitted between these elements.

Figure 8:
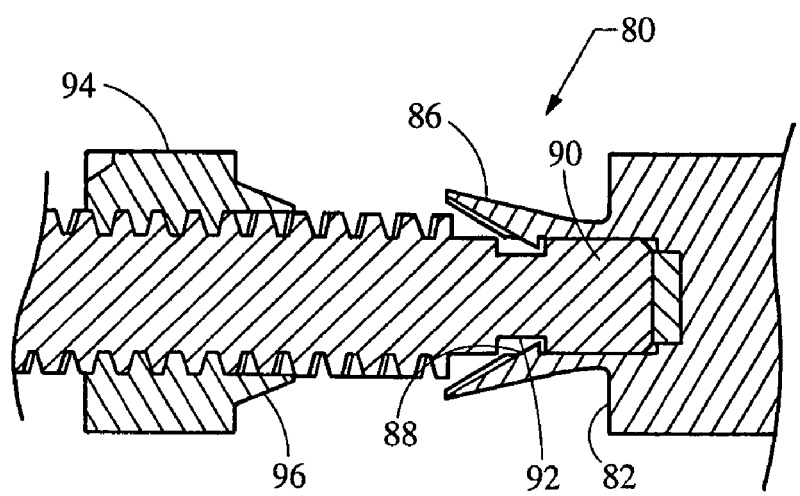
FIG. 8 is a cross-sectional view of a third embodiment of a coupler between the threaded rod and strut plunger showing the elements assembled.
Figure 9:
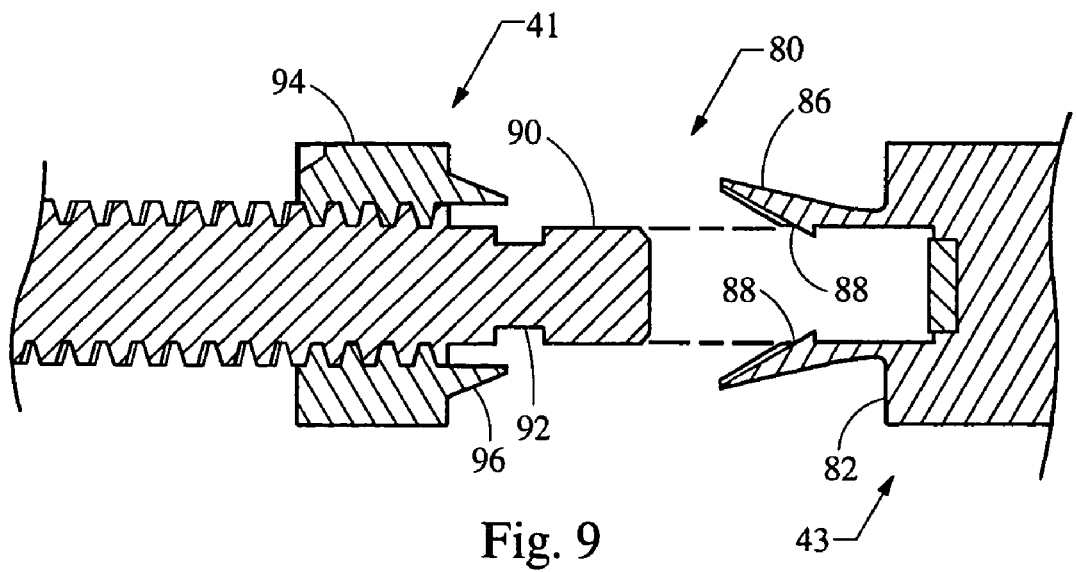
FIG. 9 is a cross-sectional view similar to FIG. 8 showing the coupler in a disengaging position.

A third embodiment of coupler 80 is shown with reference to FIG. 8. In this instance, retainer 82 includes engagement elements in the form of fingers 86 having inwardly directed barbs 88, similar to those described in connection with coupler 60. In a similar fashion, depressing rod drive end 90 into retainer 82 causes fingers 86 to be expanded outwardly until barbs 88 engage with groove 92. This embodiment of a coupler differs from the previously embodiments in that nut 94 is modified to incorporate a projecting conical extension 96. Coupler 80 can be disengaged simply by advancing nut 94 to a position causing conical end 96 to engage with fingers 86, causing them to expand in a manner similar to the previous embodiments.

Figure 10:
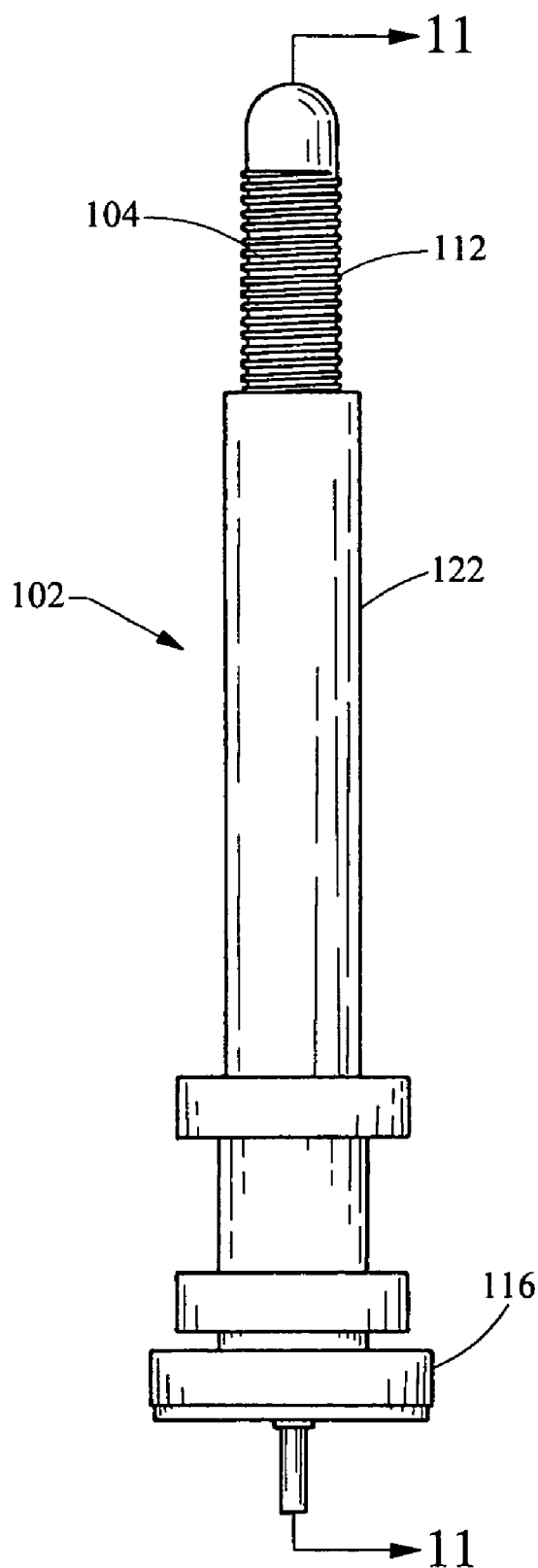
FIG. 10 is an elevational view of an integrated spring actuator strut assembly in accordance with a second embodiment of this invention.
Figure 11:
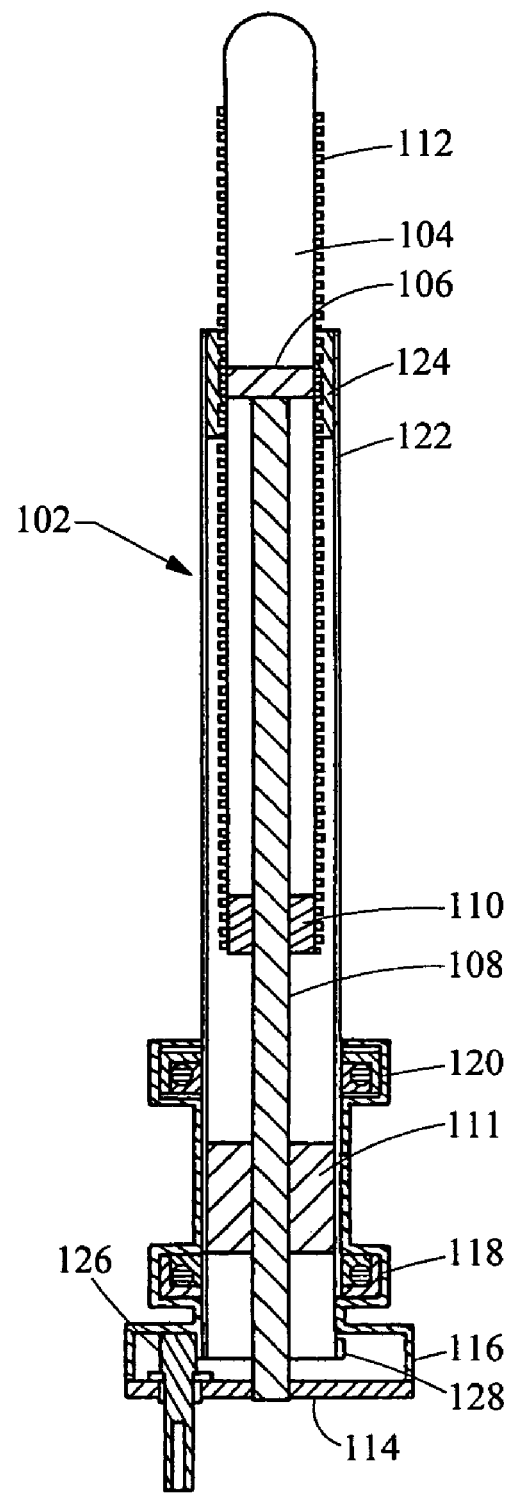
FIG. 11 is a longitudinal cross-sectional view of the assembly of FIG. 10 taken along line 11—11 of FIG. 10.

An alternate embodiment of integrated spring actuator strut assembly 102 is shown with reference to FIGS. 10 and 11. This second embodiment differs from strut assembly 18 in that gas strut cylinder 104 is of generally conventional internal construction, utilizing internal plunger 106 and a smooth rod 108 which passes through collar 110. In this embodiment, however, the external surface of cylinder 104 forms threads 112 to perform the function of the threaded rod in the prior embodiment. The projecting end at the top of the figures would be affixed to an upper lift gate vehicle mount (not shown). The opposite lower end of rod 108 is mounted to base plate 114 which in turn is affixed to a lower vehicle mount (not shown). Housing 116 is also affixed to base plate 114 and forms an open cylinder providing mounting locations for bearings 118 and 120. Outer nut carrier tube 122 is journaled for rotation within housing 116 via bearings 118 and 120. Outer nut carrier tube 122 extends to its top end where nut 124 is positioned. Nut 124 has internal threads which mate with the external threads of strut cylinder 104.

A cable (not shown) drives pinion gear 126, which in turn mates with drive gear 128, mounted to outer nut carrier tube 122. Rotation of pinion gear 126 causes rotation of drive gear 128 and, consequently, rotates outer nut carrier tube 122. This rotation causes the threaded position of nut 124 to move along the outer surface of strut cylinder 104. Cylinder 104 is constrained from rotating due to its connection to the lift gate and an upper vehicle mount (not shown). As in the first embodiment, this motion causes the open position of lift gate 12 to move as desired. The release clutch provided in the drive system described previously would also be used in this embodiment to allow manual actuation of the device. Integrated spring actuator strut assembly 102 allows the internal construction of the gas spring elements with cylinder 104 to be of conventional construction. This permits automatic temperature compensation features to be preserved as well as allowing some carry-over parts to be used for the assembly.

A still further alternative embodiment of an integrated spring actuator assembly is not illustrated, but would simply reverse the configuration shown in FIGS. 10 and 11 with the motor causing rotation of strut cylinder 104, while nut 124 would remain in a fixed position.

Now with reference to FIGS. 12, 13, and 14, various embodiments of ball-and-socket type connectors are described which may be used for attaching the strut assemblies of this invention to a vehicle at upper lift gate mount 28 and lower vehicle mount 32. As mentioned previously, it is important to establish an accurate relationship between the rotated position of the internally threaded components (nuts 34 or 124) and the externally threaded components (rod 20 or cylinder 104) and the extended distance between the upper and lower vehicle mounts 28 and 32. Conventional ball-and-socket arrangements allow a high degree of angular lost motion to occur at the joint, which causes a drop in accuracy in that correlation. FIGS. 12 and 13 illustrate a first embodiment of a connector assembly 130 which includes socket 132 and ball stud 134. This design approach constrains rotation about the Z axis illustrated in FIG. 12 through use of anti-rotation clip 136 installed within socket 132. Anti-rotation clip 136 includes a pair of projecting tabs 138 which engage with ball stud collar 140. The engagement between tabs 138 and collar 140 defines a limited degree of angular rotation about the Z axis which is the axis about which the relative rotation between the internally and externally threaded components occurs. Connector assembly 130 however continues to provide the desired degree of angular motion desired to accommodate the change in orientation of the system components as the lift gate 12 is moved between its opened and closed positions.

FIG. 14 illustrates a second embodiment of a connector assembly 144. In this embodiment, socket 146 integrally defines projecting walls 148 which engage with ball stud collar 140 in a manner similar to that described in connection with connector assembly 130. This embodiment also constrains lost motion about the Z axis. In the case of both connector assemblies 130 and 144, allowed relative rotation about the orthogonal X and Y axes is greater than that allowed about the Z axis.

Throughout this specification, gas spring type devices are described as providing a force applying mechanism for counterbalancing the weight of the vehicle lift gate. However, it is within the scope of this invention to implement other types of force applied or damping mechanisms. For example, mechanical springs, hydraulic fluid or other systems could be implemented in connection with the mechanical drive systems described herein.

While the above description constitutes the preferred embodiment of the present invention, it will be appreciated that the invention is susceptible to modification, variation and change without departing from the proper scope and fair meaning of the accompanying claims.

The invention claimed is:

1. An integrated spring actuator strut assembly for controlling the motion of a motor vehicle closure panel comprising:
   a strut subassembly including a hollow cylinder forming a first vehicle mount and having an internal plunger, the hollow cylinder defining a longitudinal axis,
   an actuator subassembly including a rod coaxially positioned on the longitudinal axis and disposed at least partially within the cylinder, the rod having an end engaging the internal plunger and an opposite end engaging a second vehicle mount,
   a releasable coupler between the strut subassembly and the actuator subassembly wherein the releasable coupler comprises the rod having a groove and a coupler coupled to the plunger and having a socket, the socket having engagement elements for engaging the rod groove,
   internal threads concentrically positioned relative to the longitudinal axis and formed on one of the rod or the cylinder,
   external threads meshing with the internal threads and concentrically positioned relative to the longitudinal axis, the external threads formed on the other of the rod or the cylinder, and
   an actuator for causing relative rotation between the internal threads and the external threads, thereby causing the distance between the first and second vehicle mount to change, moving the closure panel and causing the plunger to move in the cylinder.

2. An integrated spring actuator strut assembly according to claim 1 wherein the closure panel is a rear hatch door of the motor vehicle.

3. An integrated spring actuator strut assembly according to claim 1 wherein the hollow cylinder and plunger define a closed gas chamber.

4. An integrated spring actuator strut assembly according to claim 1 wherein the actuator comprises an electric motor mounted remotely from the rod and cylinder and transmitting rotation through a cable.

5. An integrated spring actuator strut assembly according to claim 1 wherein the rod forms the external threads and a nut affixed within the cylinder forms the internal threads.

6. An integrated spring actuator strut assembly according to claim 5 wherein the actuator comprises an electric motor mounted remotely from the rod and cylinder rotating a cable coupled to the rod causing the rod to rotate.

7. An integrated spring actuator strut assembly according to claim 5 further comprising an anti-friction thrust bearing positioned between the rod and the plunger to reduce torque loads transmitted between the rod during relative rotation between the rod and the plunger.

8. An integrated spring actuator strut assembly according to claim 5 wherein the second vehicle mount is fixed to the rod by a bearing.

9. An integrated spring actuator strut assembly according to claim 1 wherein the coupler further having a release ring which may be displaced to withdraw the engagement elements from the groove allowing the strut subassembly to be separated from the actuator subassembly.

10. An integrated spring actuator strut assembly according to claim 1 wherein at least one of the first or second vehicle mount comprises a ball-and-socket connecter, the connecter having a socket and a ball stud within the socket, the socket adapted to be affixed to the vehicle and the ball stud adapted to be affixed to one of the rod or the cylinder, the ball-and-socket connector allowing an angular range of motion about the longitudinal axis which is less than the angular range of motion allowed about at least one axis orthogonal to the longitudinal axis.

11. An integrated spring, actuator strut assembly for controlling the motion of a motor vehicle closure panel comprising:
   a hollow cylinder forming a first vehicle mount and having an internal plunger, the hollow cylinder defining a longitudinal axis, the cylinder and plunger defining a closed gas chamber,
   a rod coaxially positioned on the longitudinal axis and within the cylinder, the rod having an end engaging the internal plunger and an opposite end engaging a second vehicle mount, the rod forming external threads,
   a bearing connecting the rod and the second vehicle mount allowing the rod to rotate,
   a nut mounted within the cylinder having internal threads meshing with the rod external threads, and
   an actuator for causing rotation of the rod, thereby causing the distance between the first and second vehicle mount to change, moving the closure panel and causing the plunger to move in the cylinder.

12. An integrated spring actuator strut assembly according to claim 11 wherein the closure panel is a rear hatch door of the motor vehicle.

13. An integrated spring actuator strut assembly according to claim 12 wherein the actuator comprises an electric motor mounted remotely from the cylinder and rod and transmitting rotation through a cable.

14. An integrated spring actuator strut assembly according to claim 11 further comprising an anti-friction thrust bearing positioned between the rod and the plunger to reduce torque loads transmitted between the rod and the plunger during their relative rotation.

15. An integrated spring actuator strut assembly according to claim 11 wherein the assembly comprises a strut subassembly, including the cylinder and the plunger, and an actuator subassembly including the rod, and further comprising a releasable coupler between the strut subassembly and the actuator subassembly.

16. An integrated spring actuator strut assembly according to claim 15 wherein the releasable coupler comprises the rod having a groove and a coupler coupled to the plunger and having a socket, the socket having engagement elements for engaging the rod groove.

17. An integrated spring actuator strut assembly according to claim 16 wherein the coupler further having a release ring which may be displaced to withdraw the engagement elements from the groove allowing the strut subassembly to be separated from the actuator subassembly.

18. An integrated spring actuator strut assembly according to claim 11 wherein at least one of the first or second vehicle mount comprises a ball-and-socket connecter, the connecter having a socket and a ball stud within the socket, the socket adapted to be affixed to the vehicle and the ball stud adapted to be affixed to one of the rod or the cylinder, the ball-and-socket connector allowing an angular range of motion about the longitudinal axis which is less than the angular range of motion allowed about at least one axis orthogonal to the longitudinal axis.

* * * * *